United States Patent [19]

Yeh et al.

[11] Patent Number: 4,556,647

[45] Date of Patent: Dec. 3, 1985

[54] OLEFIN POLYMERIZATION

[75] Inventors: Gene H. C. Yeh; Joel L. Martin; Henry L. Hsieh, all of Bartlesville, Okla.

[73] Assignee: Phillips Petroleum Company, Bartlesville, Okla.

[21] Appl. No.: 705,392

[22] Filed: Feb. 25, 1985

Related U.S. Application Data

[62] Division of Ser. No. 650,034, Sep. 13, 1984.

[51] Int. Cl.$^4$ ............................................... C08F 4/52
[52] U.S. Cl. ................................... 502/102; 502/123; 502/125
[58] Field of Search ..................... 502/102, 123, 125

[56] References Cited

U.S. PATENT DOCUMENTS

| | | | |
|---|---|---|---|
| 2,921,060 | 1/1960 | Stuart | 502/102 X |
| 2,953,531 | 9/1960 | Anderson et al. | 502/102 |
| 3,030,349 | 4/1962 | Stickney et al. | 502/102 X |
| 3,179,647 | 4/1965 | Mulley et al. | 502/102 X |
| 3,297,667 | 1/1967 | Von Dohlen | 260/82.1 |

*Primary Examiner*—Patrick P. Garvin
*Attorney, Agent, or Firm*—Howard D. Doescher

[57] ABSTRACT

A process for producing a novel-highly active lanthanide containing catalyst comprising the product formed by admixing a lanthanide hydroxyhalide and an electron donor bidentate organic ligand chosen from among diamines, dihydric alcohols, and diketones with an organoaluminum cocatalyst component and its use in the polymerization of olefins, especially olefins such as ethylene and 1,3-butadiene.

11 Claims, No Drawings

OLEFIN POLYMERIZATION

This application is a divisional of application Ser. No. 650,034, filed Sept. 13, 1984 now allowed.

BACKGROUND OF THE INVENTION

This invention relates to a process for producing olefin polymers and to a high activity catalyst suitable for use in the process. The present invention relates to a catalyst, the method for making the catalyst, and a polymerization process for employing the catalyst.

In accordance with one aspect, this invention relates to an improved olefin polymerization catalyst produced by admixing a rare earth metal hydroxyhalide and a bidentate organic ligand containing from 2 to about 20 carbon atoms selected from among diamines, diols and diketones. Diamines are presently preferred. In accordance with another aspect, this invention relates to a catalyst system comprising a lanthanide-containing catalyst component and a cocatalyst comprising an organoaluminum compound. In accordance with still another aspect, this invention relates to the formation of olefin polymers from conjugated dienes, vinyl monomers, and alpha-olefins in the presence of a rare earth metal hydroxyhalide-containing catalysts produced as set forth herein.

It is old in the field of olefin polymerization to prepare solid polymers by employing catalyst systems comprising a transition metal compound and an organometallic cocatalyst. It is also known that the productivity of such catalyst can generally be improved if the transition metal compound is employed in conjunction with another metal compound. Many of the prior art catalyst systems are relatively low in activity and, as a result, research continues in an effort to improve the catalyst systems with respect to production of olefin polymers. The present invention is concerned with new high productivity catalysts which employ rare earth metal hydroxyhalide as one of the components of the catalyst for the production of polymers from olefins.

Accordingly, an object of this invention is to provide an improved polymerization catalyst.

A further object of this invention is to provide an improved process for the production of olefin polymers.

Other objects, aspects, as well as the several advantages of the invention will be apparent to those skilled in the art upon reading the specification and the appended claims.

SUMMARY OF THE INVENTION

In accordance with the invention, a lanthanide-containing catalyst component is produced by admixing a rare earth metal hydroxyhalide and a bidentate organic ligand under such conditions that a suspension or complex of these materials is obtained.

In accordance with another embodiment of the invention, a lanthanide-containing catalyst component comprising a rare earth metal hydroxyhalide-bidentate organic ligand is combined with an organo-aluminum co-catalyst component to form a catalyst composition suitable for the polymerization of olefins.

Further in accordance with the invention, olefins and especially alpha-olefins and conjugated dienes are polymerized under polymerization conditions employing the above catalyst.

DETAILED DESCRIPTION OF THE INVENTION

The lanthanide-containing component (component A) of the polymerization catalyst of the invention is formed from a rare earth metal hydroxyhalide and an electron donor bidentate organic ligand.

Thus, in accordance with the invention, an active catalyst for polymerizing alpha-olefins, conjugated dienes and vinyl monomers comprises a rare earth metal hydroxyhalide associated with at least one electron donor bidentate organic ligand selected from among diamines, dihydric alcohols and diketones. This catalyst component is used with a cocatalyst comprising at least one organoaluminum compound (component B).

The rare earth metal hydroxyhalide of catalyst component A can comprise any one of the rare earth metals of the lanthanide series, including those metals of atomic number ranging from 57–71.

The lanthanide-containing catalyst component can be produced under conditions such that a suspension of the component is formed by admixing a bidentate ligand, a solvent or diluent and a rare earth metal hydroxyhalide (hydroxide halide). The metal hydroxyhalide can be expressed as $Ln(OH)_a X_{3-a}$ where Ln is a rare earth metal such as La, Ce, Pr, Nd, Sm, Gd, Tb, Dy and Ho, generally Nd or Pr, X is a halogen atom, usually chlorine, and a can vary from about 0.1 to about 2.9. Neodymium is the presently preferred rare earth metal.

The electron donor bidentate ligand employed according to the invention comprises any organic compounds having from 2 to about 20 carbon atoms selected from among diamines, dihydric alcohols, and diketones.

The bidentate ligand employed is preferably an aliphatic diamine, usually selected from among the ethyleneamine and propyleneamine families. However, an aromatic diamine can be used. Specific examples include: ethylenediamine (presently preferred), diethylenetriamine, triethylenetetraamine, 1,2-propanediamine, 1,3-propanediamine, 1,4-butanediamine, hexamethylenediamine, 1,20-eicosanediamine, p-phenylene diamine, and the like and mixtures.

Another group of ligands that can be used comprise organic compounds containing the divalent carbonyl group (C=O) present in 1,2-diketones, 1,3-diketones and 1,4-diketones containing from 2 to about 20 carbon atoms per radical. Exemplary compounds include 2,3-butanedione, 4,5-octanedione, 2,4-pentanedione (acetylacetone), 2,4-hexanedione, 3-ethyl-2,4-pentanedione, 5,5-dimethyl-1-3-cyclohexanedione, 2,5-hexanedione, 6-methyl-2,5-heptanedione, 2,5-octadecanedione, and the like and mixtures.

Still another group of organic compounds that can be used include those containing hydroxyl groups present in dihydric alcohols such as diols, glycols, glycol ethers, and the like. The ligand is one selected from a dihydric alcohols containing from 2 to about 20 carbon atoms, preferably an alkylene glycol containing about 6 to 16 carbon atoms and an aliphatic ether of alkylene glycols containing from 2 to about 6 carbon atoms. Examples of the dihydric alcohols include 1,2-ethanediol, 1,2-propanediol, 1,3-propanediol, 1,4-hexanediol, 1,10-decanediol, 1,12-dodecanediol, 1,2-hexadecanediol and 1,20-cicosanediol. Example of ethers derived from alkylene glycols include 2-ethoxyethanol (glycol monoethyl ether or ethylk cellosolve), 2-butoxyethanol, 2-phenoxyethanol, monoethyl ether of diethyleneglycol (ethyl carbitol), diethyl ether of diethylene glycol (diethyl carbitol) and the like and mixtures.

The mole ratio of bidentate ligand to lanthanide can range from about 1 to about 10, preferably from about 3 to about 7.

The complex can be formed at temperatures ranging from about 25° to about 150° C., preferably from about 60° to abut 100° C. at reaction time ranging from about 1 minute to about 72 hours, preferably from about 10 minutes to about 24 hours.

The amount of solvent or diluent employed in the formation of the complex is generally within the range of about 5 to about 300 grams of solvent per gram of rare earth metal hydroxyhalide.

Typical solvents or diluents, include the normally liquid hydrocarbons having 3 to 12 carbon atoms such as propane, cyclohexane, n-heptane, methylcyclohexane, toluene, xylenes, and the like, and mixtures.

The components used to prepare catalyst component A (Step 1) can be mixed in any order. For example, any two components can be mixed prior to introduction of the third component. It is likewise within the scope of this invention to combine all components simultaneously in a reactor.

The lanthanide-containing catalyst components described above can be combined with an organoaluminum compound (Step 2) to form an active catalyst effective for the polymerization of olefins.

The organoaluminum compound used in step 2 of the catalyst formation can be a compound having the formula

$$AlR_nX_{3-n}$$

wherein R is a hydrocarbyl radical containing 1 to about 20 carbon atoms, X is a hydrogen, halogen, preferably chlorine or bromine, or alkoxide having 1-20 carbon atoms, and n is a number of 1 to 3. Thus suitable types of organoaluminum compounds are selected from trihydrocarbylaluminum, dihydrocarbylaluminum halide, hydrocarbylaluminum dihalide, dihydrocarbylaluminum hydride, dihydrocarbylaluminum alkoxide, hydrocarbylaluminum dialkoxide and the like, and mixtures thereof.

Examples of suitable specific organoaluminum compounds that can be used according to the invention include triethylaluminum, triisobutylaluminum, diethylaluminum hydride, diisobutylaluminum hydride, diethylalumihum chloride, diisobutylaluminum chloride, and the like, and mixtures thereof.

The organoaluminum compound can be combined with a solution of the product of step 1. Preferably, the hydrocarbon solution of the organoaluminum compound is combined with a solution of the product of step 1.

The organoaluminum cocatalyst is used in amounts ranging from about 10 to about 200 moles per mole of lanthanide hydroxyhalide and in a preferred range of 20 to about 40 moles per mole of lanthanide hydroxyhalide. It should be noted that each mole of ligand in the catalyst inactivates one mole of organoaluminum cocatalyst and, therefore, higher amounts of ligand will require higher amounts of organoaluminum cocatalyst. Thus, the mole ratio of organoaluminum cocatalyst to ligand is at least one and will preferably be in the range of about 2/1 to about 20/1 moles of organoaluminum per mole of ligand associated with the lanthanide hydroxyhalide.

The temperatures employed in step 2 can vary over a wide range, generally being in the range of about 0° to about 150° C., and preferably about 25°–80° C. Following the combination of the organoaluminum compound and the solution of step 1, the composition is generally stirred or agitated for a sufficient time to insure complete mixing of the components, e.g., a few minutes to about 2 hours. After stirring is discontinued, the solids product is recovered by filtration or decantation, washed with a dry hydrocarbon such as n-heptane, etc., to remove any soluble material that may be present and optionally dried.

Suitable as the olefins which can be used herein are ethylene, and higher 1-olefins such as propylene, butene-1, hexene-1, and the like, vinyl monomers such as styrene and conjugated diolefins, such as butadiene, isoprene, trans-1,3-pentadiene, trans-2-methyl-1,3-pentadiene, trans-trans-2,4-hexadiene, 2,3-dimethylbutadiene, and the like, and mixtures containing 2 or more polymerizable unsaturated hydrocarbons as enumerated above. A particular group of olefins to be polymerized according to the invention includes unsaturated hydrocarbons having 2 to 6 carbon atoms and having at least one polymerizable ethylenic double bond.

These polymerizable monomers are polymerized by use of a catalyst composition of the present invention whereby a polymer with the various properties depending on the type of catalyst, monomer(s), and polymerization conditions employed, e.g., the type of solvent, polymerization temperature, polymerization pressure, etc., is obtained. Further, not only homopolymers can be produced from the polymerizable unsaturated monomer but also copolymers can be produced by employing a plurality of said monomers in accordance with the process of the present invention.

The polymerization reaction by use of a catalyst composition of the present invention can be carried out in the presence of a solvent or a diluent with advantages. Suitable as the solvent for the instant reaction system are inert hydrocarbons, or halogenated hydrocarbons, e.g., butane, pentane, hexane, heptane, isooctane, cyclohexane, methyl-cyclohexane, benzene, toluene, xylene, tetralin, decalin, and other aliphatic, alicyclic, aromatic hydrocarbons, or mixtures thereof, or petroleum fractions free from polymerizable unsaturation, tetrachloroethylene, chlorobenzene, o-dichlorobenzene, and the like.

The process for polymerizing olefins by use of a catalyst composition of the present invention can be carried out in a batch type, semi-continuous type, or continuous type reactor. Polymerization pressure can vary depending on the type of monomer, the catalytic activity of the catalyst system, the desired degree of polymerization, etc. Generally, the present polymerization reaction can be carried out at a temperature in the range of about 0° to about 200° C., preferably a temperature of about 25° to about 100° C. Polymerization pressure can be subatmospheric or superatmospheric pressure up to about 300 atmospheres and preferably from atmospheric pressure to about 100 atmospheres.

Polymerization can be carried out in gas phase in the absence of a solvent or a diluent. In a presently preferred mode of operation, however, polymerization is accomplished in the presence of a solvent or diluent which is liquid under the reaction conditions employed.

Generally, when using a solvent or diluent in the instant polymerization reaction, it is convenient to introduce olefin into a dispersion containing the catalyst of the present invention in the solvent or diluent. The catalyst composition can be added in its whole amount to the polymerization system at the start of the polymerization or it can be added portion-wise over the period for the polymerization.

In order to carry out the present invention by a continuous or semi-continuous process, the contact between catalyst and monomer can be effected by various ways. For example, the olefin can be contacted with the catalyst in the form of a fixed bed, a slurry, a fluid bed, or a movable bed.

In order to recover a produced polymer from the polymerization system, the crude polymerization product is, for example, taken up and subjected to solvent extraction, hot filtration under a pressure or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLE I

Neodymium hydroxychloride, 0.47 g (2.2 mmole), having the formula $Nd(OH)_{2.4}Cl_{0.6}$ and 0.60 g (10 mmole) of ethylene diamine (ED) were mixed with 10 mL (7.7 g) of cyclohexane at reflux temperature overnight. One mole Nd compound was associated with about 5 moles of ED. The weight ratio of solvent to Nd compound was about 16 to 1. Individual portions of the resulting suspension (0.5 mL, equivalent to about 0.1 matom of Nd) was employed with an organoaluminum compound as cocatalyst in the polymerization of 1,3-butadiene.

A polymerization vessel was charged with 200 mL of solvent (cyclohexane or toluene), 16 g of 1,3-butadiene to give a calculated 0.625 mmole catalyst per 100 parts by weight monomer (MHM), and organoaluminum compound (variable) as cocatalyst. The polymerization system was agitated in a constant temperature bath at 50° C. for 3 hours or 19 hours, as specified. Polymerization was terminated by the addition of about 2 parts by weight of butylated hydroxytoluene per 100 parts by weight of polymer. The polymer was recovered by coagulation in isopropanol and drying in vacuo overnight at 60° C. The organoaluminum compounds employed as cocatalysts and the polymerization results obtained are set forth in Table 1.

The results in Table 1 show that polybutadiene with high cis-1,4 configuration having medium to high viscosity was prepared with the inventive catalysts. The difference in choice of reaction medium, cycloparaffin or aromatic hydrocarbon, upon conversion effected, gel formed and intrinsic viscosity is seen in comparing the results obtained in runs 1, 2 with cyclohexane as the solvent and in runs 3–8, with toluene as the solvent. In cyclohexane, conversion is approximately tripled at about 1/6 the reaction time, inherent viscosity is increased from about 5 to 10 times, relative to the results obtained in a toluene solvent.

EXAMPLE II (Control)

Catalysts comprising neodymium hydroxide associated with ethylene diamine were prepared in the manner described before. Catalyst A was made by employing 0.47 g (2.4 mmoles) of $Nd(OH)_3$, 0.60 g (10 mmoles) of ED and 10 mL of cyclohexane. The resulting complex had a calculated composition of $Nd(OH)_3$ 4 ED. Catalyst B was made by employing 0.47 g (2.4 mmoles) of $Nd(OH)_3$, 0.90 g (15 mmoles) of ED and 10 mL of cyclohexane. The resulting complex had a calculated composition of $Nd(OH)_3$ 6.2 ED. As before, 0.5 mL portions of catalyst, equivalent to about 0.1 matom of Nd, was employed with an organoaluminum compound as cocatalyst in the polymerization of 1,3-butadiene.

Catalyst A, 0.1 mmole of $Nd(OH)_3$ 4 ED was employed in separate polymerization runs with 16 g of 1,3-butadiene and 3.1 mmole of TEA and with 7.75 mmole of TEA as cocatalyst in 200 mL of cyclohexane for 24 hours at 50° C. No polymer was formed in either run.

Similarly, catalyst B, 0.1 mmole of $Nd(OH)_3$ 6.2 ED was employed with 10.8 mmole of TEA as cocatalyst in 200 mL of cyclohexane and 16 g of 1,3-butadiene in a 20 hour polymerization run at 50° C. No polymer was formed.

These runs illustrate that complexes of $Nd(OH)_3$ and ethylenediamine in the absence of halide are inactive for the polymerization of 1,3-butadiene under the conditions used.

We claim:
1. A polymerization catalyst system comprising
   (1) a catalyst component A formed by admixing a rare earth metal hydroxyhalide and an electron donor bidentate organic ligand having from 2 to about 20 carbon atoms selected from among diamines, dihydric alcohols, and diketones, and
   (2) a cocatalyst component B comprising an organoaluminum compound.

TABLE 1

| Run No. | Solvent | Cocatalyst Type | MHM | mmole | Run Time Hrs. | Conv. % | Cis[a] % | Intrinsic Viscosity | Gel[b] % |
|---|---|---|---|---|---|---|---|---|---|
| 1 | cyclohexane | TEA[c] | 19 | 3.1 | 3 | 89 | 97 | 10.1 | 35 |
| 2 | cyclohexane | TEA | 46 | 7.75 | 3 | 89 | 97 | 7.73 | 43 |
| 3 | toluene | TEA | 19 | 3.1 | 19 | 32 | 95 | 6.2 | 6 |
| 4 | toluene | TEA | 46 | 7.75 | 19 | 21 | 94 | 5.6 | 4 |
| 5 | toluene | DEALH[d] | 13 | 2.24 | 19 | 29 | 97 | 5.5 | 7 |
| 6 | toluene | DEALH | 34 | 5.6 | 19 | 27 | 96 | 4.3 | 4 |
| 7 | toluene | DIBALH[e] | 15 | 2.44 | 19 | 28 | 97 | 6.2 | 6 |

[a]Cis configuration in polymer determined as in U.S. 3,278,508 col. 20 lines 71 ff, col. 21 lines 1–21.
[b]Inherent viscosity and gel determined as in U.S. 3,278,508 col. 20, notes a and b
[c]triethylaluminum
[d]diethylaluminum
[e]diisobutylaluminum hydride 2. A catalyst according to claim 1 wherein the mole ratio of ligand to rare earth metal hydroxyhalide ranges from about 1 to about 10.

3. A composition according to claim 1 wherein said organoaluminum cocatalyst component is present in amounts ranging from about 10 moles to about 200 moles per mole of rare earth metal hydroxyhalide, 4. A composition according to claim 2 wherein said hydroxyhalide has the formula $$Ln(OH)_aX_{3-a}$$

wherein Ln is a rare earth metal, X is a halogen, and a ranges from about 0.1 to about 2.9, and said ligand is an aliphatic or aromatic polyamine.

5. A composition according to claim 4 wherein said rare earth metal hydroxyhalide is neodymium hydroxychloride, said ligand is ethylenediamine, and said cocatalyst is one of diethylaluminum hydride, triethylaluminum, triisobutylaluminum, or diisobutylaluminum hydride.

6. A process for producing a catalyst for the polymerization of olefins comprising
  (1) combining a rare earth metal hydroxyhalide and an electron donor bidentate organic ligand having from 2 to about 20 carbon atoms selected from among diamines, dihydric alcohols, and diketones in an inert liquid diluent under conditions to form a complex, and
  (2) contacting the product of (1) with an organoaluminum compound to form a polymerization catalyst system in which the mole ratio of organoaluminum compound to rare earth metal hydroxyhalide ranges from about 10 to about 200 moles per mole and a mole ratio of ligand to rare earth metal ranging from about 1 to about 10.

7. A process according to claim 5 wherein the conditions under which said hydroxyhalide and ligand are contacted ranges from about 25° to about 150° C.

8. A process according to claim 7 wherein the organoaluminum cocatalyst is one of a trihydrocarbylaluminum, dihydrocarbylaluminum halide, hydrocarbylaluminum dihalide, dihydrocarbylaluminum hydride, dihydrocarbylaluminum alkoxide, and hydrocarbylaluminum dialkoxide.

9. A process according to claim 6 wherein said hydroxyhalide has the formula $$Ln(OH)_aX_{3-a}$$

wherein Ln is a rare earth metal, X is a halogen, and a ranges from about 0.1 to about 2.9 and said ligand is an aliphatic or aromatic polyamine.

10. A process according to claim 9 wherein said hydroxyhalide is neodymium hydroxychloride of the formula $Nd(OH)_{2.4}Cl_{0.6}$, said amine is ethylenediamine, and said diluent is cyclohexane.

11. A process according to claim 10 wherein said organoaluminum cocatalyst is diethylaluminum hydride, diisobutylaluminum hydride, or triethylaluminum or triisobutylaluminum.

* * * * *